3,323,950
FUEL CELL CONSTRUCTION
Albert R. Hilton, Richardson, and Charles G. Peattie, Dallas, Tex., assignors to Texas Instruments Incorporated, Dallas, Tex., a corporation of Delaware
Filed Oct. 16, 1962, Ser. No. 230,957
6 Claims. (Cl. 136—86)

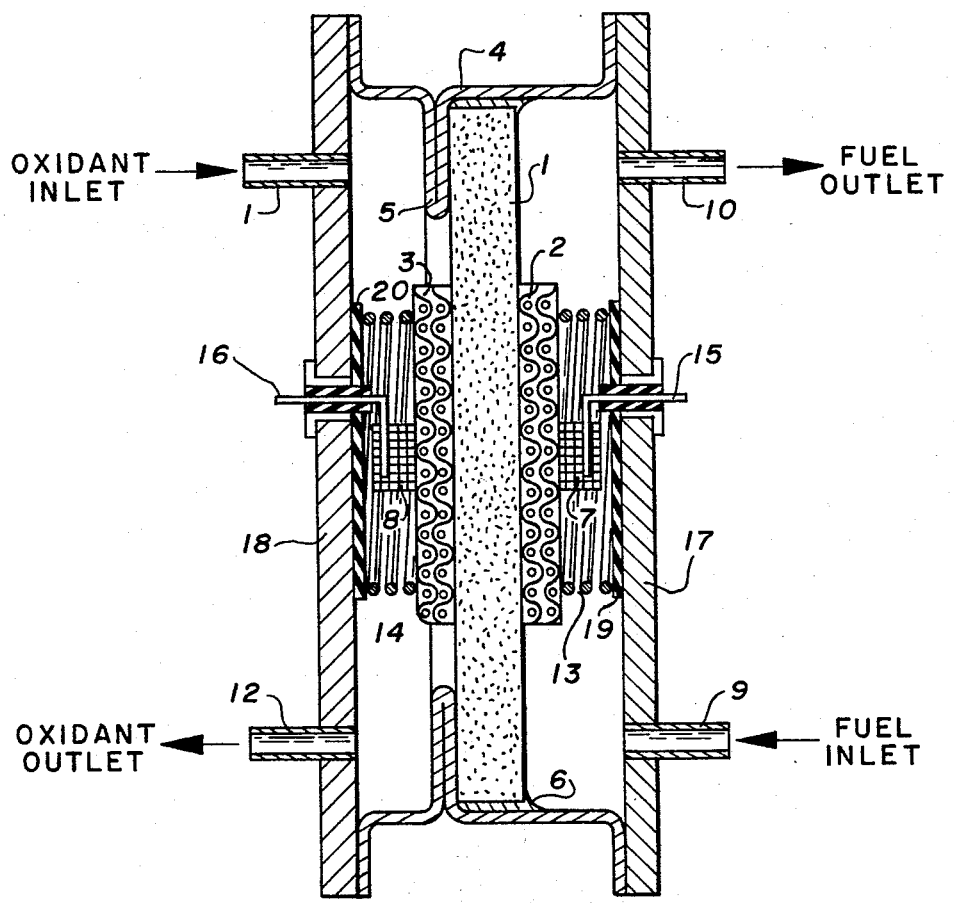

This invention relates to fuel cell construction and more particularly to a sealant used in constructing fuel cells capable of operation at temperatures up to at least about 700° C. for extended periods of time.

In a fuel cell having an oxidant electrode and a fuel electrode interposed by an electrolyte carrier, it is necessary to prevent the oxidant gas at the oxidant electrode and the fuel gas at the fuel electrode from mixing. For low temperature fuel cells such isolation of the oxidant and fuel gases is not difficult to achieve; however, in fuel cells which must withstand not only high temperature operation for extended periods, but also temperature cycling from ambient room temperature to as high as 1000° C., sealing the oxidant electrode chamber from the fuel electrode chamber to avoid mixing of the fuel and oxidant gases presents more of a problem.

The invention herein provides the desired sealing of the oxidant and fuel electrode chambers by the use of a sealing alloy of ballium and silver. Briefly, in accordance with the invention, a freshly prepared gallium-silver alloy is placed in desired locations of the fuel cell assembly to afford sealing of the oxidant electrode away from the fuel electrode, and then the assembly is heated to about 700° C. to set the alloy.

It is therefore an object of the invention to provide a fuel cell wherein an alloy is used to seal the oxidant electrode away from the fuel electrode thereby preventing mixing of the fuel and oxidant gases;

It is another object of the invention to provide a fuel cell in which the oxidant electrode and the fuel electrode located on opposite sides of an electrolyte carrier are sealed therein by an alloy of gallium and silver which prevents mixing of the fuel and oxidant gases at high temperature;

It is a further object of the invention to provide a gallium-silver alloy which is useful in constructing fuel cells for high temperature operation to avoid mixing oxidant gas with the fuel gas within the fuel cell;

It is still another object of the invention to provide a gallium-silver alloy which is useful in the construction of a high temperature fuel cell and to provide a method for sealing such fuel cells, thus avoiding leakage between the oxidant electrode and the fuel electrode which would allow mixing of the oxidant and fuel gas.

Other objects and advantages of the invention will be readily apparent from the detailed description and appended claims taken in conjunction with the drawing wherein the sole figure schematically illustrates a fuel cell utilizing the sealant of the invention.

Referring to the sole figure there is illustrated a molten electrolyte fuel cell. The cell consists of an electrolyte carrier 1 which may be a magnesium oxide disk impregnated with a molten electrolyte such as sodium lithium carbonate. Fuel electrode 2 is a porous, electrically conductive material which may be nickel gauze or any suitable material maintained in initimate contact, with carrier 1. Oxidant electrode 3 likewise may be nickel material which is porous and electrically conductive and may be nickel gauze. Also, U.S. Patent 2,914,596 granted to E. Gorin et al. discloses suitable air or oxidant and fuel electrodes which may be employed in the invention.

The electrolyte carrier or disk 1 having fuel electrode 2 and oxidant electrode 3 in intimate contact with opposed sides is mounted in a body 4, seated against a pressed shoulder 5. Carrier 1 is attached to body 4 by alloy layer 6. Alloy layer 6 is a gallium-silver alloy comprising from 5 to 20 percent by weight gallium and the rest silver, but may be from 0.1 to 49 percent by weight gallium and preferably 15 percent by weight.

Electrode 2 has attached thereto by silver solder or other suitable means a silver screen contact 7. Electrode 3 has attached thereto by silver solder or other suitable means a silver screen contact 8. Attached to body 4 on the fuel electrode side is a cap 17 having a fuel inlet 9 and outlet 10. Cap 17 has an insulated electrical lead through 15 which is attached to screen contact 7 prior to welding cap 17 to body 4. Also, silver soldered or spot welded to electrode 2 is a spring 13 which abuts against an insulating layer 19 to maintain electrode 2 in intimate contact with carrier 1 when cap 17 is welded to body 4.

In a similar manner as above, oxidant electrode 3 has a screen contact 8 and a spring 14 attached thereto. Cap 18 attached to body 4 by welding has an oxidant inlet 11 and outlet 12 therein. Also provided in cap 18 is an insulated electrical lead through 16 which prior to welding cap 18 to body 4 is attached to screen contact 8. Spring 14 abuts against an insulating layer 20 on cap 18 thus preventing electrical shorting of electrode 3.

The preferred technique for attaching carrier 1 to body 4 with the gallium-silver alloy 6 is as follows. First, an alloy of gallium and silver, preferably 15 percent gallium and 85 percent silver by weight, is made by blending silver powder with liquid gallium. The silver powder may be precipitated silver metal, analytical reagent grade, which may be obtained from Mallinckrodt Chemical Works 3600 N. Second Street, St, Louis 7, Missouri. Also, silver powder having a mesh size of —20 +40 (National Bureau of Standards) may be used.

Next, shoulder 5, and preferably the interior of body 4, is flame sprayed with a coating of oxide, for example spinel (a mineral compound of aluminum and magnesium) after which shoulder 5 is coated with liquid silver, for example Hanovia Liquid Silver (manufactured and sold by Engelhard Industries, Inc., East Newark, New Jersey). Also, the carrier 1, preferably made of magnesium oxide, is coated along the peripheral region to be sealed with the liquid silver. While the liquid silver is still wet, the alloy is packed with a tamping tool and hammer between the carrier 1 and shoulder 5 of body 4. The alloy is then painted with the liquid silver. The assembly is heated to 700° C. at a rate of about 10° per minute which allows proper aging of the alloy.

The binary phase diagram of gallium-silver indicates that the alloy is solid at temperatures up to 950° C. at less than 1 percent by weight gallium and is solid at temperatures up to over 300° C. at 49 percent by weight gallium. The phase diagram of gallium-silver appears on page 22 of the Handbook Constitution of Binary Alloys, 2nd edition, by Max Hensen, published by McGraw-Hill Book Company, Inc., New York, 1958.

Reviewing the phase diagram, it will be seen that through the composition range of about 0.1 percent to 13 percent by weight gallium, the solidus temperature decreases from 950° C. to 611° C. while the liquids temperature decreases from about 960° C. to 760° C. The composition from 13 to 16 percent by weight gallium has a constant solidus temperature of 611° C. and a decrease in liquidus temperature from 760° C. to 710° C. with a composition of 49 percent by weight gallium the solidus temperature is 326° C.

From the above it will be appreciated that compositions from 0.1 percent to 16 percent by weight gallium are satisfactory for sealants to be used at temperatures exceeding 600° C. Also, compositions from 13 percent to 49 percent by weight gallium provide sealing at temperatures of at least 325° C.

Numerous fuel cells have been made using the sealing alloy of the invention without failure attributable to seal failure allowing mixing of oxidant and fuel gases.

Table I following lists some of the fuel cells utilizing the sealant of the invention. The fuel cells set out in Table I are typical examples of 33 cells using an alloy of 20 percent gallium (by weight) and the remainder silver for the seal, 282 cells using an alloy of 15 percent gallium (by weight) and the remainder silver for the seal, and 38 cells using an alloy of 10 percent gallium (by weight) and the remainder silver for the seal.

TABLE I

| Cell No. | AgGa Composition | Cell Operating Temperature, °C. | Fuel [1] | Voltage (volt) | Current (amp) | Cell Life (days) |
|---|---|---|---|---|---|---|
| 1 | | >600 | H₂ | 0.5 | 0.8 | 1 |
| 2 | 90-10 | 750 | H₂ | 0.5 | 0.1 | 1 |
| 3 | 90-10 | 650 | H₂, ethane, propane, CH₃NO₃, NH₃, allyl alcohol, ethyl bromide | 0.5 | 0.4 | 15 |
| 4 | 90-10 | 550-750 | H₂, butane, propane, isobutane | 0.5 | 0.3 | 5 |
| 5 | 90-10 | 650-700 | H₂, kerosene, propane, n-hexane, 2,3 dimethylbutane | 0.5 | 0.7 | 5 |
| 6 | 85-15 | 600 | H₂ | 0.5 | 2.2 | 42 |
| 7 | 85-15 | 600-700 | H₂, kerosene | 0.5 | 1.2 | 17 |
| 8 | 85-15 | 600 | H₂ | 0.7 | 1.14 | 60 |
| 9 | 85-15 | 600 | H₂ | 0.7 | 1.24 | 90 |
| 10 | 85-15 | 600 | H₂, white gasoline | 0.5 | 0.4 | 19 |
| 11 | 85-15 | 600 | CO, CO₂, H₂ | 0.5 | 0.5 | 12 |
| 12 | 80-20 | 600-700 | H₂ | 0.5 | 1.2 | 15 |
| 13 | 80-20 | 600-700 | H₂, methyl cyclohexane | 0.5 | 1.3 | 16 |
| 14 | 80-20 | 600-700 | H₂, propane | 0.5 | 1.6 | 17 |
| 15 | 85-15 | 600 | H₂ | 0.7 | 1.2 | 59 |
| 16 | 85-15 | 325-385 | H₂ | 0.65 | 0.9 | 13 |

[1] The oxidant gas was air in all cells.

It will be readily appreciated that various changes and modifications will become readily apparent to those skilled in the art, and such changes and modifications are deemed to be within the spirit and scope of the invention which is limited only by the scope of the appended claims.

What is claimed is:

1. A fuel cell comprising a housing having a continuous internal periphery, said housing having an inwardly projecting shoulder along the entire inner periphery of said housing and a magnesium oxide disk conforming to the inner periphery of said housing and sealed against said shoulder by an alloy consisting essentially of from 0.1 to 49 percent by weight gallium and the remainder substantially silver, a fuel electrode in intimate contact with one side of said magnesium oxide disk and an oxidant electrode in contact with the opopsite side of said magnesium oxide disk, means to make electrical contact to said fuel electrode and means to make electrical contact to said oxidant electrode, means to introduce fuel gas in intimate contact with said fuel electrode, and means to introduce oxidant gas in intimate contact with said oxidant electrode.

2. In a high temperature fuel cell having a housing and a magnesium oxide electrolyte carrier secured to said housing and dividing said fuel cell into a fuel chamber and oxidant chamber; an alloy consisting essentially of from 0.1 to 49 percent gallium and the remainder substantially silver securing said magnesium oxide electrolyte carrier to said housing and forming a seal between said fuel chamber and said oxidant chamber.

3. In a high temperature fuel cell having a housing and a magnesium oxide electrolyte carrier secured to said housing and dividing said fuel cell into a fuel chamber and oxidant chamber; an alloy comprising about 90 percent silver and about 10 percent gallium securing said magnesium oxide electrolyte carrier to said housing and forming a seal between said fuel chamber and said oxidant chamber.

4. In a high temperature fuel cell having a housing and a magnesium oxide electrolyte carrier secured to said housing and dividing said fuel cell into a fuel chamber and oxidant chamber; an alloy comprising about 80 percent silver and about 20 percent gallium securing said magnesium oxide electrolyte carried to said housing and forming a seal between said fuel chamber and said oxidant chamber.

5. The method of forming a seal between the oxidant chamber and fuel chamber of a high temperature fuel cell comprising sealing the electrolyte carrier to the fuel cell housing with an alloy consisting essentially of from 0.1 to 49 percent by weight gallium and the remainder substantially silver.

6. The method of forming a seal between the fuel and oxidant chambers of a high temperature fuel cell comprising the steps of:
   (a) flame spraying a coating of oxide on the peripheral regions of an electrolyte carrier;
   (b) flame spraying a coating of oxide over the surfaces of the fuel cell housing which mate with said electrolyte carrier;
   (c) applying a coating of liquid silver on said oxide coating on said surfaces of the fuel cell housing which mate with said carrier;
   (d) placing the electrolyte carrier in the fuel cell housing;
   (e) packing an alloy comprising from 0.1 to 49 percent by weight gallium and the remainder substantially silver between the electrolyte carrier and the mating surface of the fuel cell housing, and
   (f) heating the assembly to a temperature of about 700° C.

No references cited.

WINSTON A. DOUGLAS, *Primary Examiner.*

H. FEELEY, *Assistant Examiner.*